Nov. 7, 1950     B. R. KING     2,528,758
GAS SHIELDED INDUCTION FUSION WELDING PROCESS
Filed July 10, 1948
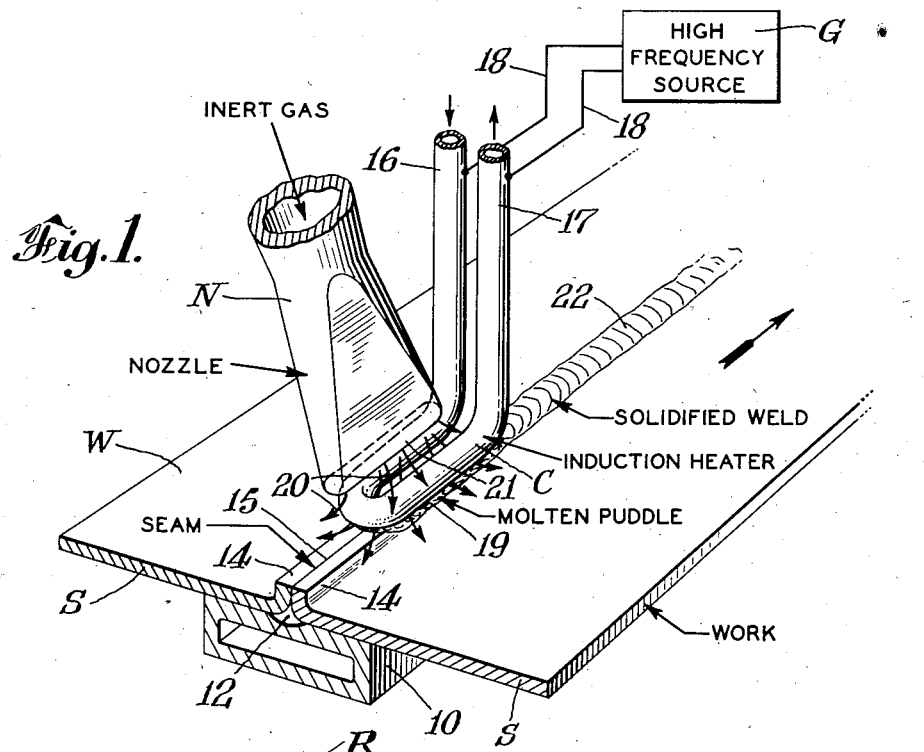
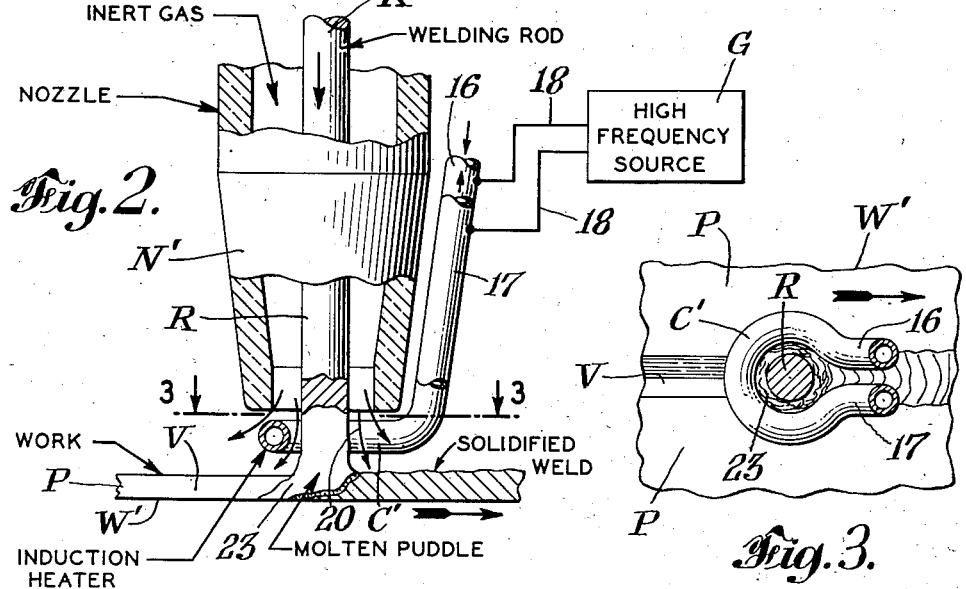
INVENTOR
BARNWELL R. KING
BY
ATTORNEY Patented Nov. 7, 1950

2,528,758

UNITED STATES PATENT OFFICE 2,528,758

GAS SHIELDED INDUCTION FUSION WELDING PROCESS

Barnwell R. King, Flushing, N. Y., assignor to The Linde Air Products Company, a corporation of Ohio Application July 10, 1948, Serial No. 38,140

5 Claims. (Cl. 219—10)

This invention relates to welding and more particularly to gas shielded induction fusion welding.

The main object of this invention is to provide a novel fusion welding process which is more effective, clean, rapid, uniform, safe and efficient than those of the prior art, and is especially suitable for welding hard-to-weld metals such as aluminum, magnesium and stainless steel. Another object is to provide an improved method of cladding base metal such as steel with another metal such as stainless steel, silver, or copper. A further object is to provide an inert gas shielded high-frequency induction fusion welding process which overcomes disadvantages and difficulties of the prior art. An additional object is to provide a novel combination of elements for effecting the fusion welding of metal with a minimum amount of deterioration of the apparatus, and without the use of corrosive flux.

According to the process of this invention progressive fusion welding of metal is accomplished by juxtaposing the parts to be welded so as to form a seam. Such seam is then traversed by a high-frequency induction heating coil which heats and melts a localized portion of the metal on both sides of the seam. The resulting pool of molten metal is shielded from atmospheric contamination by a stream of inert monatomic gas, such as argon or helium, which is discharged from a nozzle held in fixed position with respect to the heating coil. Such coil is located preferably between the nozzle and the work so that gas flows over the coil before it flows over the pool of molten metal. The stream of inert monatomic gas thus protects and helps to keep the coil cool, and also preheats the gas somewhat before contacting the work. As the pool of molten metal solidifies the parts are integrally united progressively from one end of the seam to the other.

In cladding and also in welding with filler metal, according to the invention, a rod of filler metal or of cladding metal is fed into the fusion zone under the coil first through or under the inert gas nozzle and then through or under the heating coil. As a result, the lower end of such rod in the vicinity of the heating coil is melted by high-frequency energy induced therein, and the resulting molten metal is protected from the atmosphere by the inert monatomic gas stream which is discharged from the nozzle. In this case too the gas also protects and cools the coil, and is preheated somewhat and is thoroughly dried or dehydrated before it flows over and protects the fused metal.

Inasmuch as fusion welding can be accomplished according to the invention without any welding flux, the use of such flux may be avoided. This is especially advantageous in the fusion welding of stainless steel and aluminum. Furthermore, since no arc is used, arc difficulties as well as electrode maintenance troubles are avoided. The invention is highly suitable for welding sheets of metal which are thin enough to flange for welding, since the induction heating coil can be moved into relatively close proximity to the upturned seam flanges during the welding pass, and the metal directly under the coil can be efficiently and quickly heated and melted by induction. Since the use of a welding arc is avoided the problem of rectification is also solved. The constant bathing of the coil in the cooling stream of argon or helium gas during the welding operation considerably prolongs the life of such coil, so that maintenance of the heater is greatly reduced compared to that of a tungsten electrode in arc welding.

Other advantages and objects of the invention will appear from the following description taken in connection with the drawing in which:

Fig. 1 is a fragmentary perspective view of apparatus illustrating one type of fusion welding according to the invention;

Fig. 2 is a fragmentary view partly in section and partly in side elevation of a modification; and Fig. 3 is a sectional view taken on line 3—3 of Fig. 2.

As shown in Fig. 1 of the drawing, the work W is mounted by means of suitable clamps (not shown) on a water-cooled back-up bar 10 of copper having a longitudinal groove 12 in the top thereof. The illustrated work W consists of two sheets S of metal having upturned edges of flanges 14 disposed in side-by-side contact, forming a welding seam 15 which is located above the groove 12. The work W and back-up bar are moved in the direction of the seam 14 under a high-frequency induction heating coil C of any suitable shape, in this modification being in the form of a "hairpin."

The coil C is composed of hollow copper tubing, through which cooling water is circulated by suitable means (not shown), the water flowing into the coil through inlet 16 and out of the coil through outlet 17. A suitable source G of electricity of high-frequency (500–500,000 cycles, for example) is connected to the inlet 16 and outlet 17 by insulated conductors 18. The source G may be an electronic power generator of suitable output power (1–200 kw.) and frequency to heat and melt the metal of the work directly under the coil C as the seam moves along in the direction thereof.

During the welding operation the pool 19 of molten metal directly under the coil and the highly heated adjacent metal of the work W is constantly shielded from the atmosphere by a stream of inert gas 20 discharged from a nozzle N composed of glass, ceramic material, (or copper, in which case the nozzle should be water-cooled by means of internal water-circulating passages). Gas is supplied to the nozzle N at a regulated rate from a suitable source under pressure (not shown). The gas is pure argon, or helium, or a mixture thereof, or gas which consists essentially thereof, for welding most metals such as stainless steel, aluminum and magnesium, for example. In the case of copper, however, some hydrogen gas can be mixed with the inert gas.

The nozzle N has a long and narrow mouth 21 disposed above the opening in the "hairpin" coil C, so that the gas flows between and over the sides of such coil on the way to the work-metal under the coil. Thus, the coil C is cooled and protected from the atmosphere and the hot metal by the gas. This also preheats the gas somewhat before it contacts the molten puddle 19 of metal, improving the efficiency of the operation. The gas stream also helps to keep cool the lower end of the nozzle. During the operation cooling water is circulated longitudinally through the hollow back-up bar 10 to prevent the latter from melting. A ceramic or non-metallic member (not shown) may be disposed between the work W and back-up bar for more efficient welding, or the back-up bar itself may be composed of ceramic material.

If desired the work W may be held stationary in which case the coil C and nozzle N are moved above the work in the direction of the seam 15. With this arrangement the coil and nozzle are best combined to provide a unitary structure in which the coil is mounted on the lower edge of the nozzle.

The process comprises inducing high-frequency energy of sufficient intensity to melt a small pool 19 of metal in the metal parts S adjacent the seam 15, and advancing such pool progressively along the seam, by advancing the induction heating coil C over the desired path, while continuously protecting the molten metal from the atmosphere by the stream of inert gas, the gas stream being discharged from the nozzle N which is relatively fixed with respect to the high-frequency induction coil C. The upturned edges or flanges of the work heat and melt relatively quickly under the high-frequency induction heating influence of the coil C, and the melted metal subsequently hardens as the coil moves along the seam 15, resulting in a sound weld 22 integrally uniting the two sheets S. During the welding operation both the coil C and the highly-heated metal under the coil C are protected from the atmosphere by the stream 20 of inert gas which is discharged by the nozzle N. The gas stream also helps to keep the coil C cool by contact therewith and by flowing between the coil and the work. The gas, being preheated somewhat by the coil C, does not quickly chill the work area heated by the coil, and the welding speed is fairly fast, especially when the work is sheet material composed of a metal having a relatively low melting point, such as aluminum and magnesium as well as alloys thereof.

In Figs. 2 and 3, "filler metal" welding or cladding is accomplished by feeding a rod or wire R of metal downwardly through the center of a nozzle N', so that the rod R also passes through a high-frequency induction heating coil C' located between the end of the nozzle and the work W'. Thus, the rod R is efficiently preheated and melted by the coil as it is fed downwardly. At the same time, the highly-heated metal of the rod within and under the coil is shielded from the atmosphere by inert gas which is discharged by the nozzle N' so that such gas flows downwardly first over the coil C' and then over the molten puddle 23 of metal in the weld zone, protecting the latter from the atmosphere. Here too, the gas is thoroughly dehydrated and preheated somewhat and helps to keep the coil cool and protected from the heat of the rod R and that of the weld zone.

The work W' is provided with a groove V in the seam between the parts, in this case plates P of the metal to be welded, which groove is filled with metal supplied by the rod R as the welding operation progresses along the seam.

It will be understood that the apparatus of Fig. 2 may be used for cladding by simply feeding a rod of selected cladding metal such as silver, stainless steel, copper etc., through the nozzle N' and coil C' as the apparatus moves over the surface of a body of the selected base metal such as steel.

While the preferred inert gas is one containing argon and/or helium, other suitable inert or non-oxidizing gases may be used, and at least in the case of melting copper, hydrogen gas may be used in place of or mixed with such gas.

While the use of flux is avoided by the invention, any suitable flux may be applied to the work and/or the welding rod, if desired.

The high-frequency source may be of any suitable generator of the electronic type or rotary type of sufficient power capacity to effect the desired heating and fusion of the work under the coil, which may, of course, be of any desired shape to match that of the work. Since the frequency of the energy can be adjusted to fall within approved limits, interference with television and radio reception is avoided.

The coil and nozzle may be constructed in one piece, if desired, without departing from the invention.

I claim:

1. Process of inert gas shielded induction fusion welding which comprises juxtaposing parts of base metal to be welded, directing a stream of inert gas selected from the group consisting of argon and helium against such parts on the zone to be welded, inducing a high-frequency current in such parts of sufficient intensity to heat the metal locally and cause the base metal of such parts to melt and form a relatively small pool of molten base metal in the welding zone, such pool of molten metal being protected from the atmosphere by said stream of inert gas, and then removing such stream of inert gas and the induced high-frequency current, so that the molten metal hardens, leaving the parts integrally united.

2. Process of fusion welding base metal progressively along a seam between abutting edges thereof which comprises moving a single open high-frequency induction coil and the base metal relatively to each other in the direction of such seam with the coil positioned near enough to the metal to cause localized heating sufficient to melt the base metal, forming a relatively small pool of molten base metal which bridges the seam, flowing a stream of non-oxidizing gas over said pool of molten base metal, and moving said stream with said coil relatively to the base metal so that the latter is protected from the atmosphere during the progress of the welding operation.

3. Process of welding a refractory-oxide type base metal of the group consisting of aluminum, magnesium and stainless steel which comprises inducing a high-frequency current of sufficient intensity in a local portion of the metal to melt the base metal of such portion, forming a relatively small pool of molten base metal while directing a stream of gas containing an inert gas selected from the group consisting of argon and helium against the top of such portion to protect the so melted pool of molten metal and the adjacent metal from atmospheric contamination.

4. Inert gas shielded continuous-feed metal-electrode electric welding of metal composed principally of aluminum with a filler metal electrode also composed principally of aluminum, which comprises feeding such filler metal electrode axially toward metal work composed principally of aluminum, supplying sufficient electrical energy by means of high-frequency heating to the end of said aluminum filler metal electrode and the adjacent aluminum work metal to fuse both only in the welding zone, and flowing a stream of inert gas consisting essentially of argon axially of and around the aluminum filler metal electrode, over the so fused aluminum and the adjacent surface of the work, so that the fused and heated aluminum are protected from the atmosphere, and the melting of the aluminum metal electrode is confined to the end thereof near the welding zone.

5. Process of fusion welding metal selected from the class consisting of aluminum, magnesium and stainless steel, which comprises applying a stream of inert gas selected from the class consisting of argon and helium against a relatively small area on a member composed of such metal, feeding a rod also composed of such metal axially through such stream of inert gas, inducing high-frequency current in such member and the adjacent end of the rod, melting a relatively small pool of metal, preheating and thereby drying such stream of inert gas before it reaches such pool, and shielding the heated metal from atmospheric contamination with the resulting dry inert gas stream.

BARNWELL R. KING.

REFERENCES CITED

The following references are of record in the file of this patent:

UNITED STATES PATENTS

| Number | Name | Date |
| --- | --- | --- |
| 1,915,047 | Blakeslee | June 20, 1933 |
| 2,237,309 | McMinn | Apr. 8, 1941 |
| 2,290,338 | Koehring | July 21, 1942 |
| 2,367,715 | Chapman | Jan. 23, 1945 |
| 2,405,542 | Wassell | Aug. 6, 1946 |
| 2,455,560 | Cobb et al. | Dec. 7, 1948 |
| 2,460,687 | Fuchs | Feb. 1, 1949 |

FOREIGN PATENTS

| Number | Country | Date |
| --- | --- | --- |
| 467,308 | Great Britain | June 15, 1937 |
| 461,139 | Belgium | May 1946 |